United States Patent [19]
Racin

[11] 4,009,515
[45] Mar. 1, 1977

[54] DISC BRAKE PISTON PULLER

[76] Inventor: Charles Racin, 2713 W. Comet Road, Clinton, Ohio 44216

[22] Filed: Jan. 23, 1976

[21] Appl. No.: 651,845

Related U.S. Application Data

[63] Continuation of Ser. No. 530,881, Dec. 9, 1974, abandoned.

[52] U.S. Cl. .................................... 29/265; 29/280
[51] Int. Cl.² .......................................... B23P 19/04
[58] Field of Search ............ 29/256, 258, 266, 280, 29/282, 263, 265

[56] References Cited

UNITED STATES PATENTS

| | | | |
|---|---|---|---|
| 1,621,733 | 3/1927 | McCord | 29/280 |
| 3,108,365 | 10/1963 | Dunkerley | 29/265 |
| 3,786,551 | 1/1974 | Gregg et al. | 29/266 |

*Primary Examiner*—James L. Jones, Jr.
*Attorney, Agent, or Firm*—Baldwin, Egan, Walling & Fetzer

[57] ABSTRACT

A tool, for manually releasing a frozen automotive brake piston from a cylindrical cavity of a disc brake caliper, has an elongated shank on an inner end of which a solid axially tapered segmental head, defining an outer tapered wall, is axially adjustably mounted. A plurality of peripherally spaced piston gripping segments are axially slidably adjustable on the tapered wall of the solid head to be radially adjusted thereon toward and from clamped engagement of the segments with the piston cavity wall. A first stop means is threaded on the outer end portion of the shank, as for axially adjustably supporting the shank to a fixed part of the brake caliper, and a second stop means may be threaded on the shank, axially inwardly of the first stop means, for selective adjustment of the tool head segments directly on said tapered wall for initially gripping or clamping the tool head to the piston wall whereby the shank may be turned to draw the second stop means and the tapered head together, first to increase the clamping grip of the segments against the piston wall, and then draw the piston toward the anchored first stop means and free of the caliper.

11 Claims, 6 Drawing Figures

DISC BRAKE PISTON PULLER

This application is a continuation application of Ser. No. 530,881, filed Dec. 9, 1974 by Applicant, and now abandoned.

BACKGROUND OF INVENTION

In the past in the automotive business and particularly in the field of repairing disc-brakes it has been difficult, if not impossible, to remove the cup-like pistons from the brake calipers with known available tools. While tools have been designed previously for this purpose, those available were not always operable or fully effective for the purposes intended under certain conditions. As an example, U.S. Pat. No. 3,762,021 discloses a tool including an axially movable cup-like tool part adapted to be cupped over an exposed upper end of the piston and to have radially inwardly presented rim portions of said tool part engaged within outwardly exposed groove means on the piston. However, it is not always possible to position the cup-like tool part to retain the rim portions in such groove means, especially when the groove means were damaged or non-existent.

SUMMARY OF INVENTION

An object of the present invention is to provide a compact unitary disc brake tool for quickly and easily removing cuplike brake discs or pistons which have become frozen in a brake caliper of known type. The new tool, for this purpose, may include a screw-threaded shank or rod having an axially tapered head threaded on an inner end of the same for axially centered reception within a cavity of the hollow piston, to leave or define an axially tapered annular space between the tapered surface of said head and the cylindrical inner wall of the piston. A plurality of separate tool head segments may have like axially tapered surfaces for complemental axial sliding engagement with the tapered surfaces of the head, upon axial adjustment of the threaded shank, yieldingly to adjust said segments toward and from tight frictional engagement with the cylindrical inner wall of the piston. Means is provided on the threaded shank for axially anchoringly supporting the threaded shank in reference to the caliper, to facilitate controlled axial adjustment of the shank, first to cam the tapered segments into said frictional engagement with the piston wall, and then to withdraw the piston axially from the caliper, for subsequent insertion of a new piston therein.

A general object of the present invention is to provide an improved composite disc brake piston puller of the character described which eliminates the need for provision of a piston gripping part to span the top of the piston, and to connect with a radially outwardly exposed groove or shoulder means not always operable or available on caliper pistons. Other objects of the invention will be manifest from the following brief description and the accompanying drawings.

Figure 1:
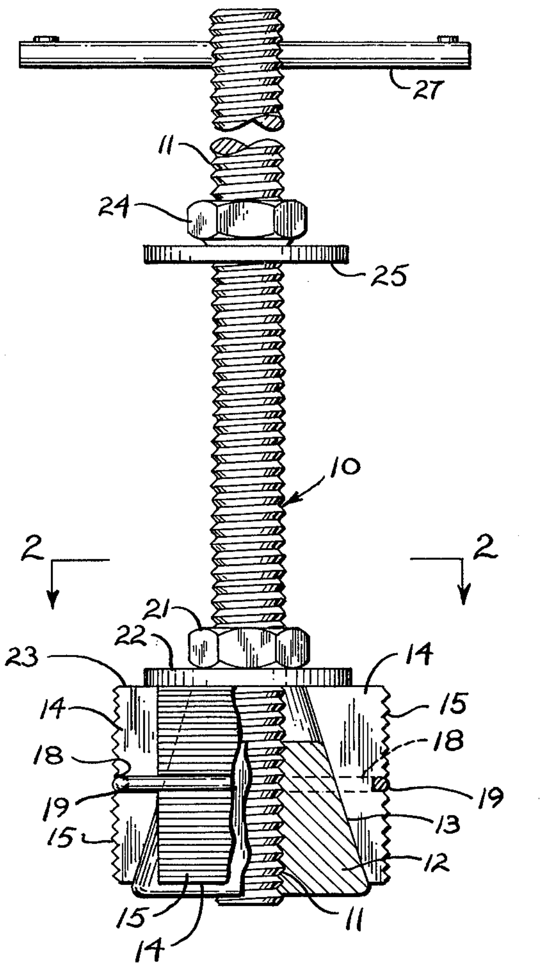
FIG. 1 is a front elevation of one embodiment of the new tool, partly broken away and in section.
Figure 2:
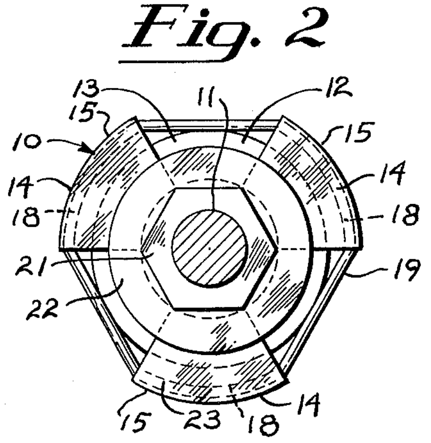
FIG. 2 is a cross-section taken on the line 2—2 of FIG. 1.

Referring to FIGS. 1 and 2, there is illustrated a brake caliper piston tool 10 of the invention, including a rigid rod-like shank 11, which may be suitably screw-threaded along its length for purposes to be described later. Screw-threaded on the inner end of the shank 11 may be a frusto-conical camming head 12, with the larger end of the same presented downward, and defining a smooth upwardly tapering, conical surface 13. Axially adjustably mounted about the tapered surface 13 may be a plurality of peripherally arranged, complementally fitting, clamping segments 14, 14, each having convex outer surfaces 15 approximating the curvate shape and diameter of the cylindrical inner wall 16 of a brake caliper disc 17, as will be described later (See FIGS. 3 and 4). The convex surfaces 15 of the segments 14 may have serrated or like roughened surfaces for improved gripping engagement with the cylindrical wall 16 of the brake caliper (See FIGS. 3 and 5). For yieldingly retaining the segments 14 uniformly spaced on the tapered surface 13, said segments may have aligned, arcuate grooves 18 therein for reception of an elastic band 19, or a like resilient means, for yieldingly urging the segments radially inwardly against the tapered surface 13. An inner stop nut 21 is threaded on the shank 11, to be axially adjustable thereon to urge a disc or stop plate 22, slidably received on the shank, against the upper surface portions 23 of the segments 14 to cam the segments radially outwardly in unison against the resiliency of the band 19.

A second nut 24 may be likewise threaded nearer the upper end of the shank, for downward threaded movement thereon against a second disc or stop plate 25, as for stop engagement of the plate against a U-shaped, rigid cross-piece 26 adapted to be positioned in stop engagement with a convenient part of the brake caliper at a level above the piston 17, in a manner and for purposes to be described later (See FIGS. 4 and 5). In addition, a handle 27 in the form of a rod may be slidably positioned through the upper or outer end of the shank 11 for turning the same during use of the tool to remove the frozen piston 17.

In particular reference to FIGS. 1 and 2 it should be noted that, while only three clamping segments 14 are shown, the number thereof may be selectively variable. It should also be noted that six segments 14, for example, may be cut from a single originally machined piece of steel, to furnish two sets of three segments for use on two different tools 10. Moreover, by using a plurality of peripherally spaced segments 14 on the tool 10 the same tool can be used for removing discs from different pistons 17 having different inner wall diameters within a limited range necessary for proper clamping engagement of the segments 14 with the piston wall.

Figure 3:
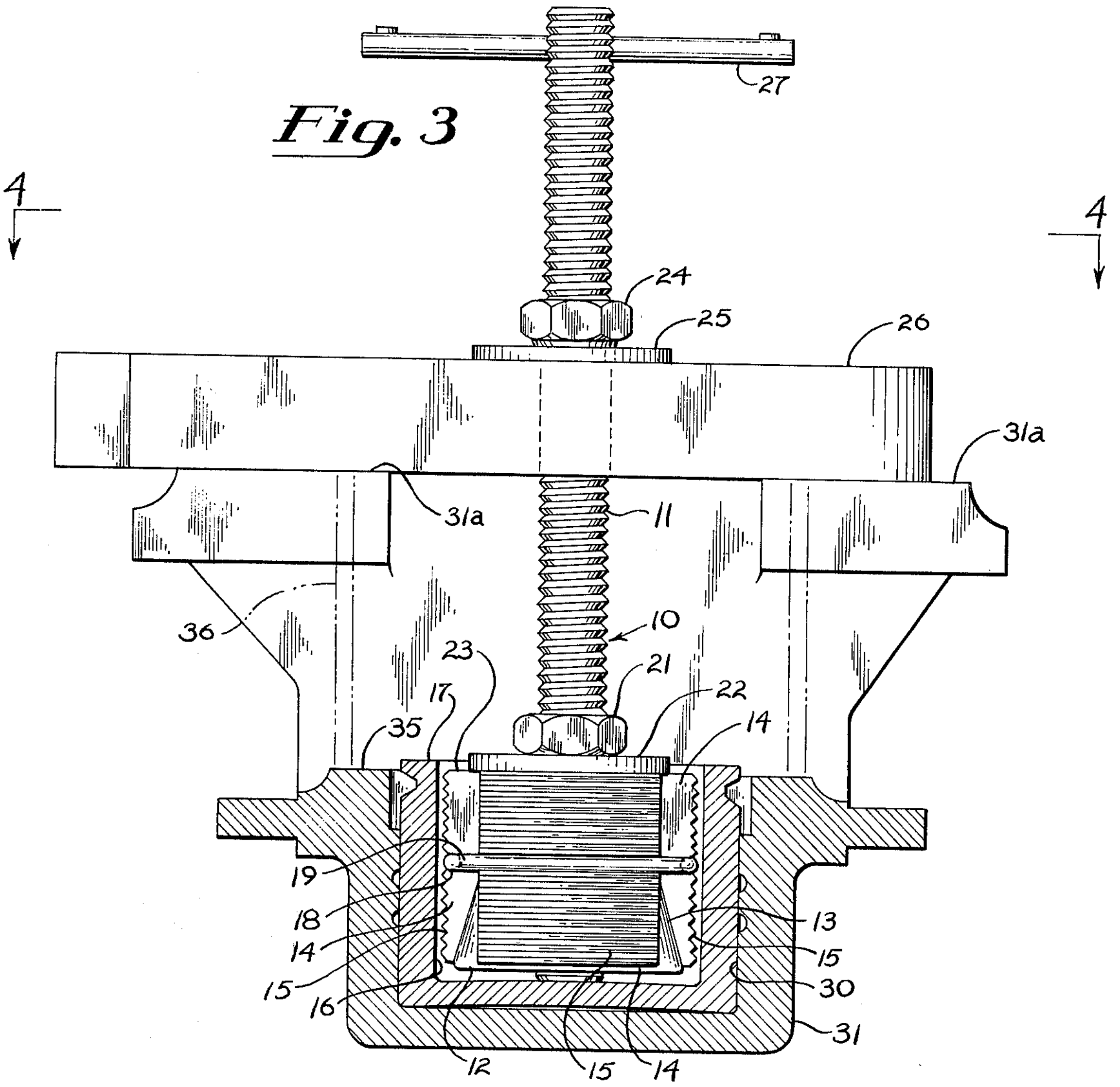
FIG. 3 is a front view, partly broken away and in section, illustrating clamping means of the tool shown in FIGS. 1 and 2, in unclamped association with a frozen piston in a brake caliper.
Figure 4:
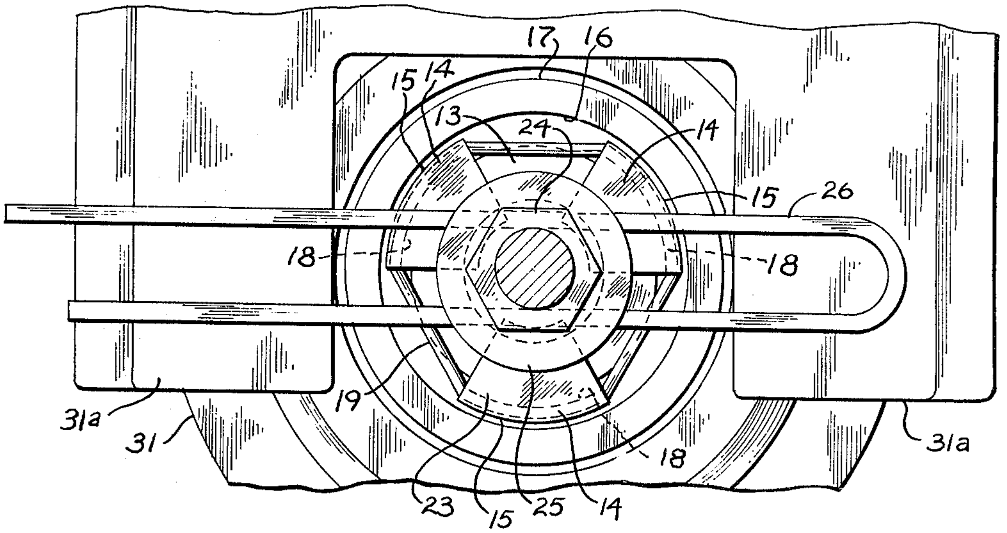
FIG. 4 is a top plain view, partly in section, as viewed on the line 4—4 of FIG. 3.
Figure 5:
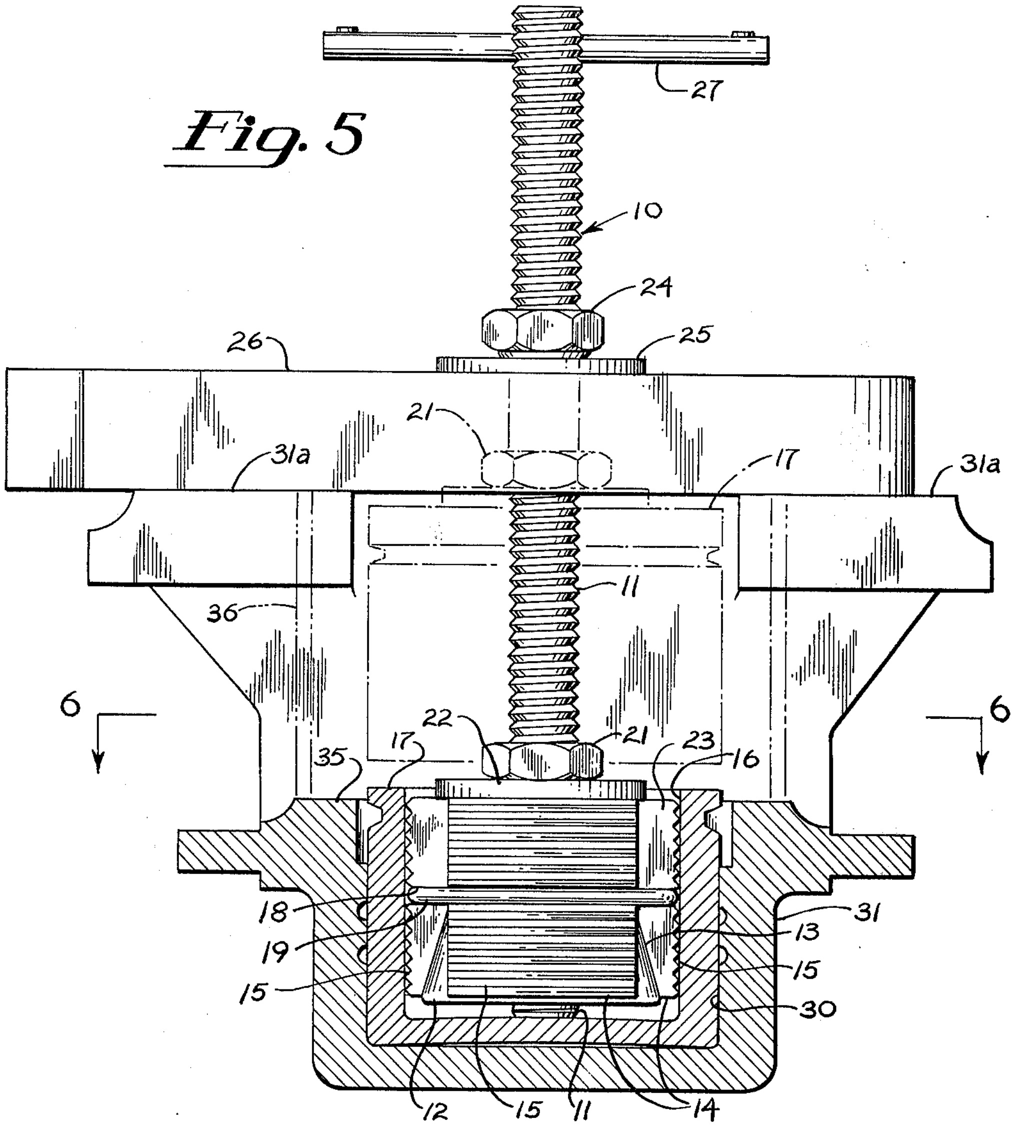
FIG. 5 is a view corresponding to FIG. 3, but illustrating the new tool with the clamping means thereof tightly gripping the frozen piston for subsequent removal thereof from the brake caliper.
Figure 6:
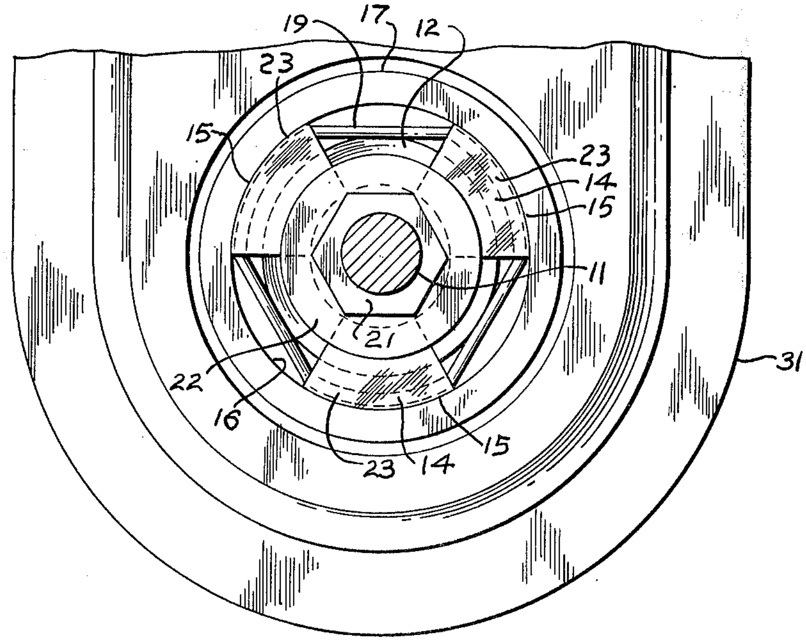
FIG. 6 is a view corresponding to FIG. 4, but taken on the line 6—6 of FIG. 5.

Referring to FIGS. 3 to 6 in general, and to FIGS. 3 and 4 in particular, use of the improved brake caliper tool 10 shown in FIGS. 1 and 2, to remove a frozen cup-shaped piston 17 from the cylindrical cavity wall 30 of the brake caliper 31, requires a first simple step of yieldingly adjusting the clamping segments or jaws 14, against the resiliency of the band 19, toward the small end of the tapered head 12, to permit free or loose reception of the spaced jaws 14 within said cavity wall, as shown in FIGS. 3 and 4, whereby the peripherally spaced jaws 14 then may be held in preadjusted jaw retracted condition, by appropriate unscrewing adjustment of the inner stop nut 21 in reference to the inner stop plate 22. The tool 10 then may be supported in this preadjusted, retracted condition by outward reception of the threaded shank 11 through the U-shaped crosspiece 26 supported on spaced ledges 31a, 31a, on the caliper 31, located outwardly of the frozen piston 17 as shown in FIGS. 3 and 4. In this adjusted position of the tool 10 the inner nut 21 may be turned inwardly against the inner stop plate 22 to draw the inner stop plate 22 and the frusto-conical head 12 together, and thereby in turn to cam the clamping segments or jaws 14 radially outward into tight clamping engagement with the cylindrical inner wall 16 of the piston 17, as shown in FIGS. 5 and 6. With the frozen caliper 17 so maintained and tightly held by said clamping segments or jaws 14, as shown in FIGS. 5 and 6, the outer adjusting nut 24 may be forcibly turned in clockwise direction on the shank 11 against the outer stop plate 25, while at the same time the shank 11 is being manually held against rotation by means of the hand-grip 27 thereon, thereby to withdraw the shank axially outward with sufficient force to release the frozen piston 17 from the caliper 31, as shown in chain-dotted lines in FIG. 5.

In situations where the caliper 31 has no ledges 31a or other suitable means spaced above the caliper shoulder 35, to support the cross-piece 26 as described above, said crosspiece 26 may be, for example, positioned on top of a metal rigid tube 36 supported on the caliper shoulder 35, as shown in chain-dotted lines in FIGS. 3 and 5.

An important advantage of having the frusto-conical head 12 screwed on the threaded shank 11, as described above, resides in the fact that the use of the improved tool need not necessarily require that the conical head should turn with the shank 11. That is, the clamping action can be selectively accomplished by turning the nut 21 to urge the segments of jaws 14 downwardly and outwardly on the head 12, from the condition shown in FIG. 3 to the clamping condition shown in FIG. 5. Moreover, with use of the structure shown, when once the gripping segments 14 start to contact the inner peripheral wall 16 of the piston 17, the shank 11 can still be free to rotate in the tapered head 12 and allow further turning of the shank for axially shifting the tapered head, thereby to urge the segments radially outward into a strong clamping grip with said peripheral wall. Accordingly, with further such manual turning of the shank 11 against the anchored first stop means or nut 24, the frozen piston can be axially removed from the brake caliper. The second or inner stop nut 21, as shown in FIG. 3, can for the purposes described be initially manually turned by the fingers to urge the gripping segments 14 into firm engagement with the piston wall 16 as shown in FIGS. 5 and 6, to accomplish full removal of the piston 17 from the brake caliper 31, as described above (see chain-dotted position of caliper in FIG. 5). If the inner end of the shank initially contacts the bottom piston wall before full clamping grip is accomplished, the clamping grip can easily be increased by turning the shank 11 and/or turning the nut 21 against the plate 22.

Modifications of the invention may be resorted to without departing from the spirit thereof or the scope of the appended claims.

What is claimed is:

1. A tool as for forcibly releasing a frozen brake piston, provided with a cylindrical inner wall portion, from a cylindrical cavity of a disc brake caliper or like work part, said tool comprising: an elongated rigid shank having outer and inner end parts; said shank having a camming tool head, screw-threaded on the inner end thereof, for axially centered reception of said camming tool head within the cavity of the piston, and said camming tool head having a radially outwardly presented conical cam surface adapted to define an annular space between said conical surface and said cylindrical inner wall portion of the piston; a plurality of separate tool head segments each having peripherally arcuate outer wall portions adapted for complemental gripping engagement with said cylindrical inner wall portion of the brake piston, and each said tool head segment also having axially tapered, peripherally arcuate inner surface areas for complemental sliding engagement with said outwardly presented conical surface of said camming tool head; said shank having a first stop means axially inwardly adjustable thereon against said camming tool head segments, to slide the segments on said conical cam surface of the camming tool head, axially to adjust said camming tool head segments radially outwardly into direct clamping engagement of said peripherally arcuate outer wall portions of the segments with the cylindrical inner wall portion of the piston; a second stop means axially adjustably mounted on said shank, axially outwardly of said first stop means, for axial adjustment of said second stop means against a relatively fixed portion on the work part, whereby said rigid shank is thereby urged axially outwardly of said caliper with said clamped piston thereon, to release and withdraw and piston from the cylindrical inner wall portion of the work part.

2. A tool as in claim 1, wherein said shank is screw threaded into said camming tool head, whereby relative turning of the shank in the same slidably adjusts said camming tool head segments axially to and from said clamping engagement with the cylindrical inner wall portion of the piston.

3. A tool as in claim 2, wherein said tapered cam surface of said camming tool head diverges axially inward and radially outward, whereby said first stop means is axially adjustable against said tapered camming tool head segments, for selective said radial adjustment of the same.

4. A tool as in claim 3, including holding means for yieldingly retaining said camming tool head segments in said complemental engagement with the tapered outer cam surface of said camming tool head.

5. A tool as in claim 1, including holding means for yieldingly retaining said camming tool head segments in complemental engagement with the tapered outer cam surface of said camming head.

6. A tool as in claim 1, including a rigid member for stop engagement with the work part, in association with said shank, against which said second stop means is anchoringly engageable for relative adjustment of said second stop means.

7. A tool as in claim 1, wherein said separate tool head segments are peripherally spaced from each other on said camming head.

8. A tool as in claim 4, said holding means including a resilient band yieldingly surrounding said tool-head segments on said camming head.

9. A tool as in claim 5 said holding means including a resilient band yieldingly surrounding tool head segments on said camming head.

10. A tool as in claim 9, said tool-head segments being recessed to receive said resilient band radially inwardly of said arcuate outer wall portions of said segments.

11. A tool as in claim 1 wherein said outer wall portions of said tool head segments are roughened, for improved gripping engagement with said cylindrical inner wall portion of the brake piston.

* * * * *